(12) United States Patent
Christini

(10) Patent No.: US 12,497,121 B2
(45) Date of Patent: Dec. 16, 2025

(54) ELECTRIC ATV INDEPENDENT DRIVE ARRANGEMENT

(71) Applicant: Christini EV, Inc., Philadelphia, PA (US)

(72) Inventor: Steven J. Christini, Philadelphia, PA (US)

(73) Assignee: Christini EV, Inc., Philadelphia, PA (US)

( * ) Notice: Subject to any disclaimer, the term of this patent is extended or adjusted under 35 U.S.C. 154(b) by 384 days.

(21) Appl. No.: 18/074,594

(22) Filed: Dec. 5, 2022

(65) Prior Publication Data

US 2023/0202610 A1 Jun. 29, 2023

Related U.S. Application Data

(60) Provisional application No. 63/285,608, filed on Dec. 3, 2021.

(51) Int. Cl.
*B60K 1/04* (2019.01)
*B62K 5/01* (2013.01)

(52) U.S. Cl.
CPC .............. *B62K 5/01* (2013.01); *B60K 1/04* (2013.01); *B60K 2001/0405* (2013.01)

(58) Field of Classification Search
CPC ..... B60K 1/04; B60K 7/0007; B60L 2200/22; B60L 2220/44; B60L 2220/46; B60L 2260/28
See application file for complete search history.

(56) References Cited

U.S. PATENT DOCUMENTS

| 6,220,382 B1* | 4/2001 | Kramer, Jr. ............ A61G 5/043 180/65.51 |
| 2010/0006351 A1* | 1/2010 | Howard .................. B60L 50/60 180/2.2 |
| 2012/0043144 A1 | 2/2012 | Hwang et al. |
| 2016/0075225 A1 | 3/2016 | Aich et al. |
| 2017/0305261 A1 | 10/2017 | Meager |
| 2021/0171147 A1 | 6/2021 | Naik et al. |

FOREIGN PATENT DOCUMENTS

| CN | 108725220 | 11/2018 |
| FR | 2961131 | 12/2011 |
| JP | 2011126502 | 6/2011 |

* cited by examiner

*Primary Examiner* — Jason D Shanske
*Assistant Examiner* — James J Triggs
(74) *Attorney, Agent, or Firm* — Volpe Koenig

(57) ABSTRACT

An electric ATV having a frame and at least one battery mounted on the frame. 4 hub motors connected to the frame, and a wheel is connected to each of the hub motors. Each of the hub motors includes an independent controller, and the hub motors and associated ones of the controllers each being configured to independently provide both forward and reverse power and torque to the respective wheels to propel the ATV. Each of the hub motors can be mechanically attached to the frame using a quick-release connector and an electrical plug connection, to allow easier service or swapping out in the field. A genset can be provided in place of a battery, and multiple independent controls may also be provided for each motor/controller. An electric ATV with frame mounted motors/independent controllers for each wheel is also provided.

9 Claims, 8 Drawing Sheets

ELECTRIC ATV INDEPENDENT DRIVE ARRANGEMENT

INCORPORATION BY REFERENCE

The following documents are incorporated herein by reference as if fully set forth: U.S. Provisional Patent Application No. 63/285,608, filed Dec. 3, 2021.

TECHNICAL FIELD

The disclosure is directed to an electric ATV (E-ATV) design that is configured on a standard ATV chassis having a design and configuration which is standard in the Industry. The E-ATV includes a chassis with 4 wheels attached to standard ATV suspension, a passenger seat and standard steering controls with handlebars.

SUMMARY

In one aspect, an E-ATV is provided having a frame, at least one battery mounted on the frame, and 4 hub motors connected to the frame, with a wheel connected to each of the hub motors. Each of the hub motors includes an independent controller, and the hub motors and associated ones of the controllers (hub motor/controller unit) are each configured to independently provide both forward and reverse power and torque to the respective wheels to propel the ATV.

In one embodiment, each of the hub motors is mechanically attached to the frame using a quick-release connector and an electrical plug connection.

Using this arrangement, each wheel forms its own "maintenance system" that can be easily serviced or swapped out in the field in order to allow critical maintenance to be carried out during use in areas outside of normal maintenance facilities.

In another embodiment, the at least one battery defines a battery envelope and the frame includes at least two receiving areas, each configured to accommodate the battery envelope. A hybrid power cell is preferably provided having approximately a same size as the battery envelope and/or that is configured to be received in one of the receiving areas. The hybrid power cell includes a fuel driven generator that is adapted to provide power for recharging the at least one battery. In the current configuration, the hybrid power cell provides power only to recharge the at least one battery and does not directly drive the motors or E-ATV wheels.

In a further embodiment, independent right and left motor switches that are configured to control a forward and reverse direction of both associated motors on a respective right or left side of the electric ATV are provided. Here, the left motor switch controls only the two left motors and the associated independent controllers, and the right switch controls only the two right motors and the associated independent controllers. The right and left motor switches provide movement functions such as the ability to make a "zero point" turn without the use of a computer or torque vectoring system.

In another embodiment, an independent control is provided that is configured to separately supply power to each of the motors and the associated controllers to selectively power one or more wheels. This allows power to be applied to one or more non-slipping wheels only if the ATV is stuck and one or more of the wheels are slipping.

In one preferred arrangement, a multi-function joystick is provided to carry out the different switching functions.

In another aspect, an electric ATV is provided having a frame with at least one battery mounted on the frame, the at least one battery defining a battery envelope and the frame including at least two receiving areas, each configured to accommodate the battery envelope. 4 motors are connected to the frame, and a wheel is drivingly connected to each of the motors in this case via a drive shaft, preferably a CV shaft. Each of the motors includes an independent controller, and the motors and associated ones of the controllers are each configured to independently provide both forward and reverse power and torque to the respective wheels to propel the ATV.

In one embodiment, a gear box is provided in the power train between each motor and the associated drive shaft in order to provide a gear reduction for increased power and torque delivery to the associated wheel.

Various other features as discussed herein can be used in connection with the electric ATV having frame mounted individual drive motor/controllers for each wheel that are drivingly connected to the respective wheels by drive shafts, such as the hybrid power cell that is provided having a same size as the battery envelope and/or can be received in the battery envelope, the independent right and left motor switches, independent controls being configured to separately supply power to each of the motors, as well as the use of a multi-function joystick to carry out the switching.

The features of the above-note embodiments may be used independently or in combinations with two or more of the features combined on a single E-ATV.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Certain terminology is used in the following description for convenience only and is not limiting. "Axially" refers to a direction along an axis of an assembly. "Radially" refers to a direction inward and outward from the axis of the assembly. The terms "about" and "approximately" and the like encompass + or −10% of an indicated value unless otherwise noted. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

E-ATV with 4 Independent Hub Motors and Motor Controllers (Motor/Controller Unit)—One for Each Wheel Referring to FIGS. 1A, 1B, and 2A-2C, a first embodiment of an E-ATV 10 is shown that includes a frame 12 on which 4 hub motors 20A-20D and 4 motor controllers 30A-30D, which form motor/controller units, which operate independently to provide both forward and reverse power and torque to propel the ATV 10, are attached. Each motor/controller 20A, 30A; 20B, 30B; 20C, 30C; 20D, 30D operates as an independent driving system. Wheels 14A-D are attached to the hub motors 20A-20D. A handle bar 16 provides user controls, as explained below. A seat 18 is also mounted to the frame 12.

Figure 2A:
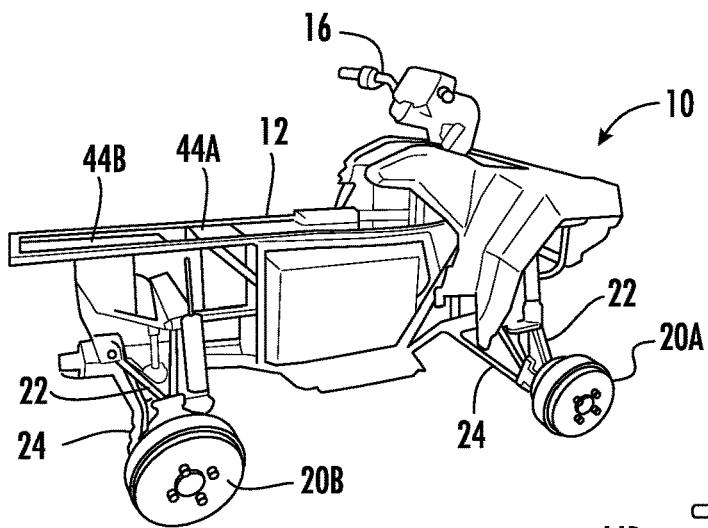
FIGS. 2A-2C show the hub motors connected to the suspension components (top and bottom A-arms) (FIGS. 2A and 2b), and a section view of a single wheel location showing the quick-disconnect system for the hub motor from the motor mount.
Figure 2B:
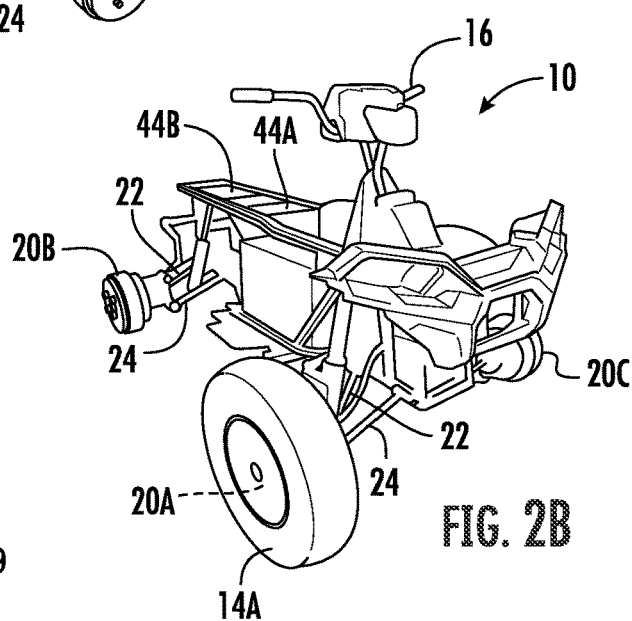
Figure 2C:
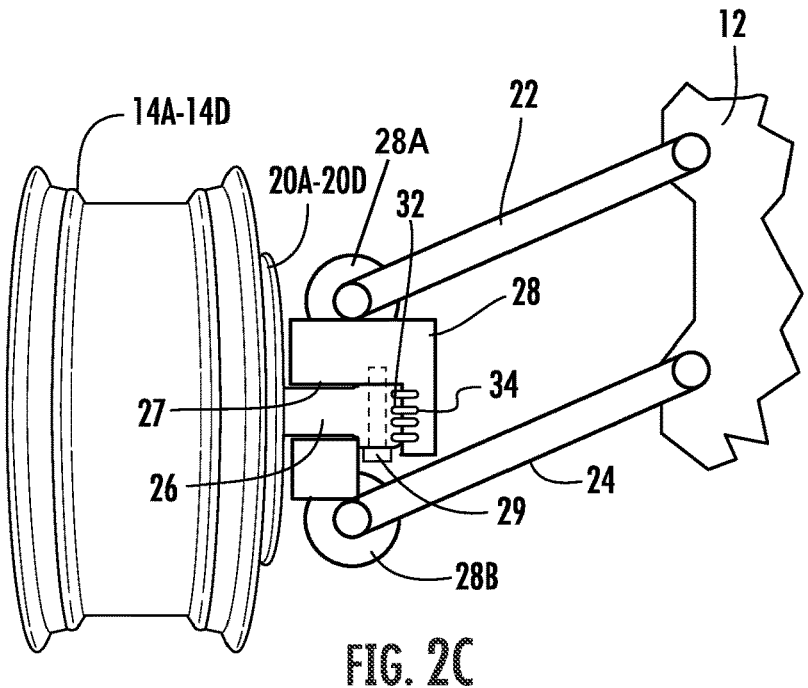
Figure 3:
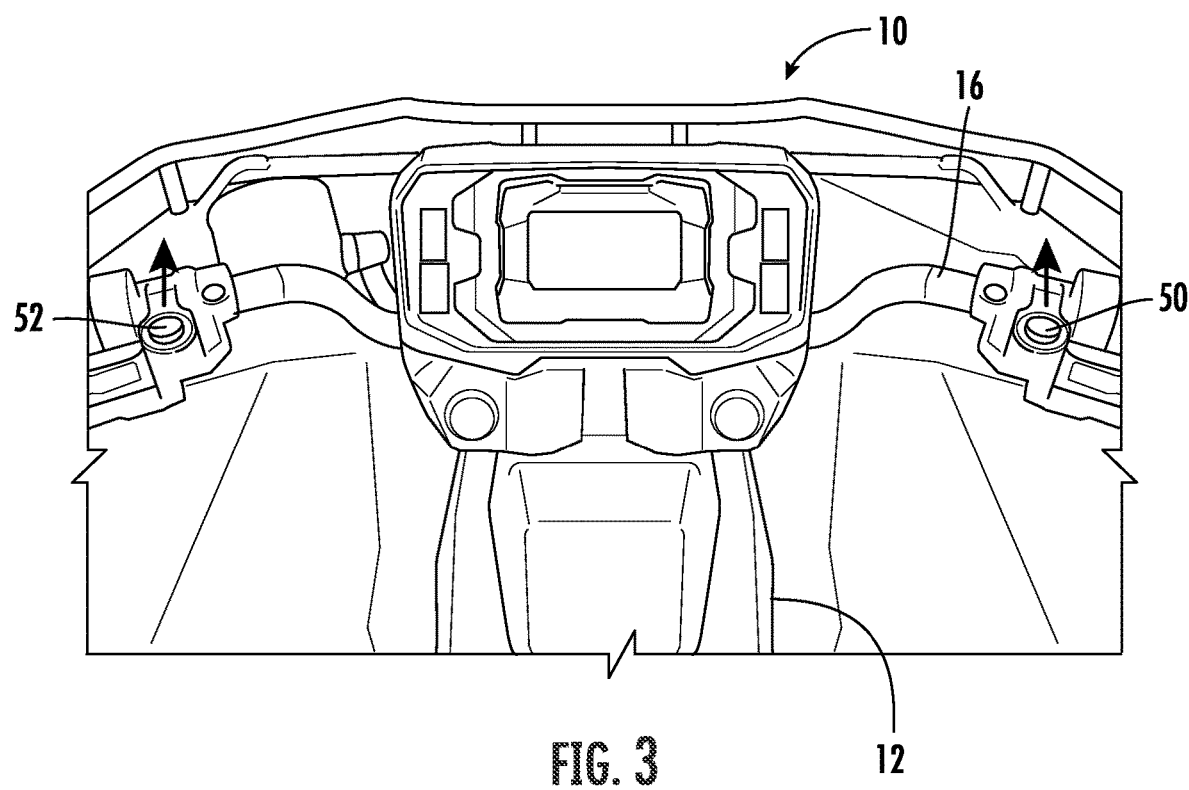
FIG. 3 shows a top view of the left and right side motor control switches in a forward direction configuration.
Figure 4:
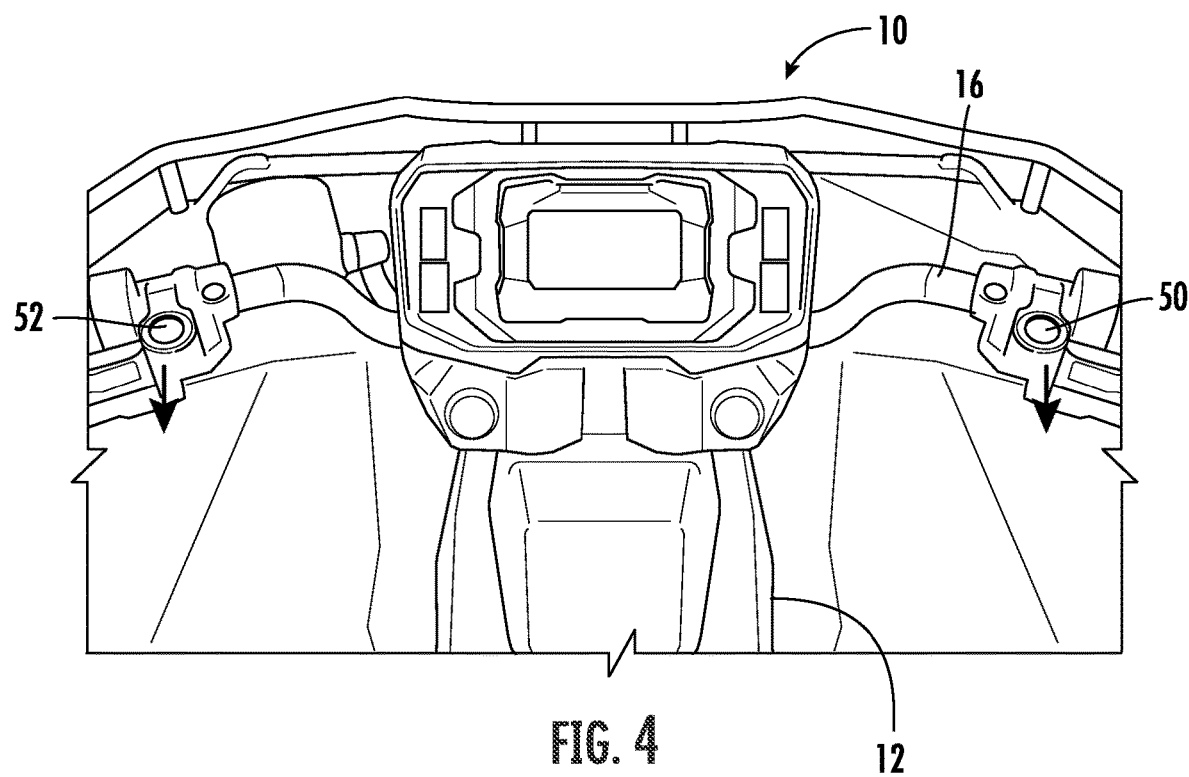
FIG. 4 shows a top view of the left and right side motor control switches in a reverse direction configuration.
Figure 5:
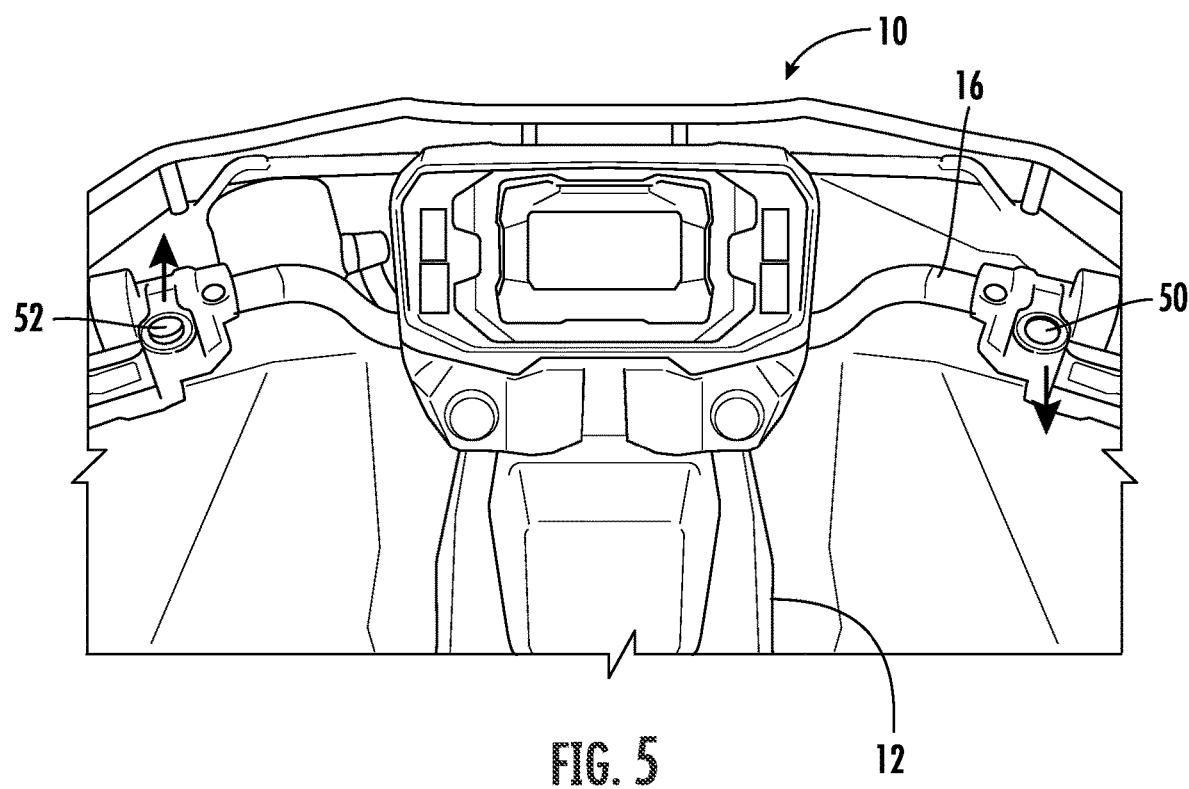
FIG. 5 shows a top view of the left and right side motor control switches in a right zero point turn configuration.
Figure 6:
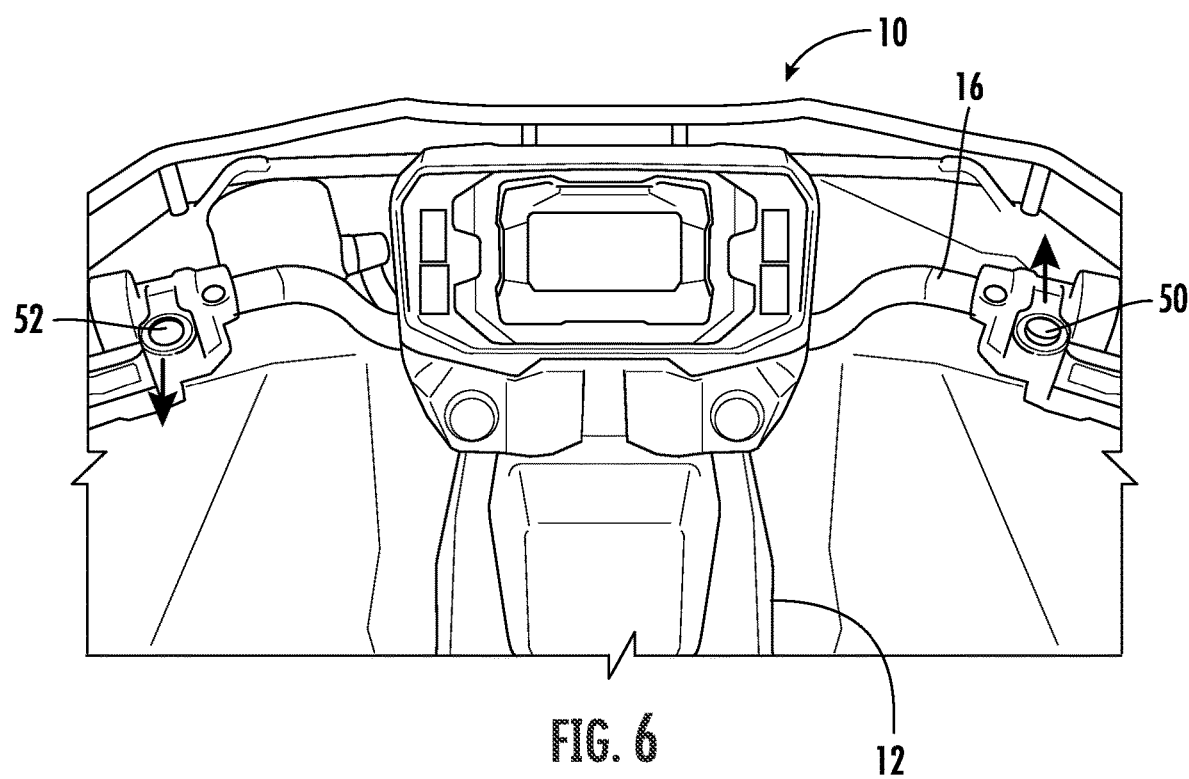
FIG. 6 shows a top view of the left and right side motor control switches in a left zero point turn configuration.

The hub motors 20A-20D are attached to the frame 12 in a way that they can be "hot swapped" or exchanged quickly without difficulty in the case of failure. FIGS. 2A and 2B show the hub motors 20A, 20B are mounted to respective upper and lower suspension arms 22 and 24 on the frame 12. In one preferred embodiment, as shown in FIG. 2C, the hub motors 20A-20D include respective axle stubs 26 that extend from the hub motors that fit into a keyway opening 27 on a hub motor mount 28 on one side. The hub motor mounts 28 are pivotally attached to the frame 12 of the E-ATV 10 via top and bottom knuckles 28A, 28B thereon that are pivotally connected to the respective upper and lower suspension arms 22 and 24 that are part of the E-ATV suspension. The hub motors 20C and 20D on the opposite side of the frame 12 are similarly attached. A quick release connector 29, preferably in the form of one or more quick disconnect pins or bolts, hold the axle stub 26 in the keyway hole 27 when it is fully inserted. The quick release connector 29 can be retained for example via a clip, cotter pin or nut, or a combination of one or more of these. The other hub motor assemblies 20B-20D are similarly connected to the frame 12 via the connection of the axle stubs 26 to the hub motor mounts 28. Removal of the quick release connector 29 allows an individual one of the hub motors 20A-20D to be quickly and easily detached from the frame for replacement.

Additionally, as shown in FIG. 2C, the electrical connection between the respective hub motor 20A-20D and its associated controller 30A-30D includes a disconnect plug 34 on order to allow for easy electrical disconnection of the hub motor 20A-20D that is being removed. In the embodiment shown in FIG. 2C, the disconnect plug 32 is shown at the end of the axle stub 26 and is slidable into a mating connector or plug 34 that is integrated in the top knuckle 28A of the hub motor mount 28. However, as would be understood by a person skilled in the art, this connection could be positioned in a different location or could use an external wire and plug.

This arrangement provides significant cost and maintenance benefits for the consumer based on the ability to easily remove and replace a hub motor assembly 20A-20D, which preferably all have the same configuration.

Two Separate Batteries Systems for Redundancy and Hot Swap

Figure 1A:
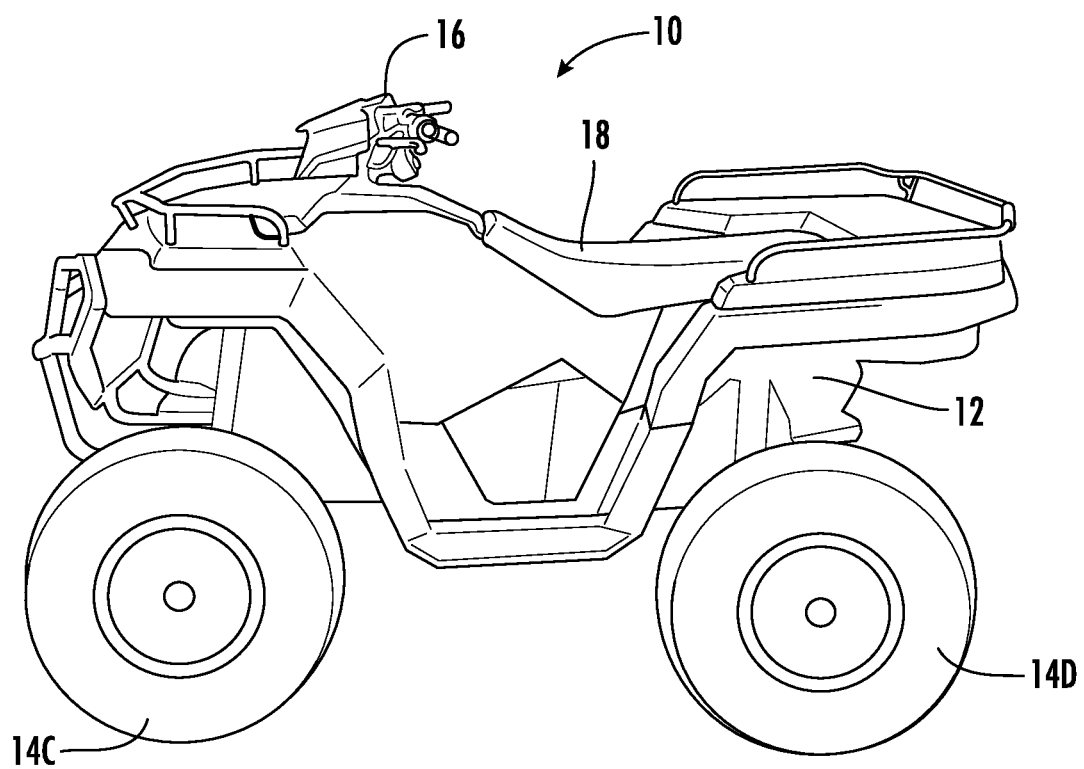
FIGS. 1A and 1B show an assembled E-ATV and a schematic top view of the E-ATV showing all of the major component assemblies.
Figure 1B:
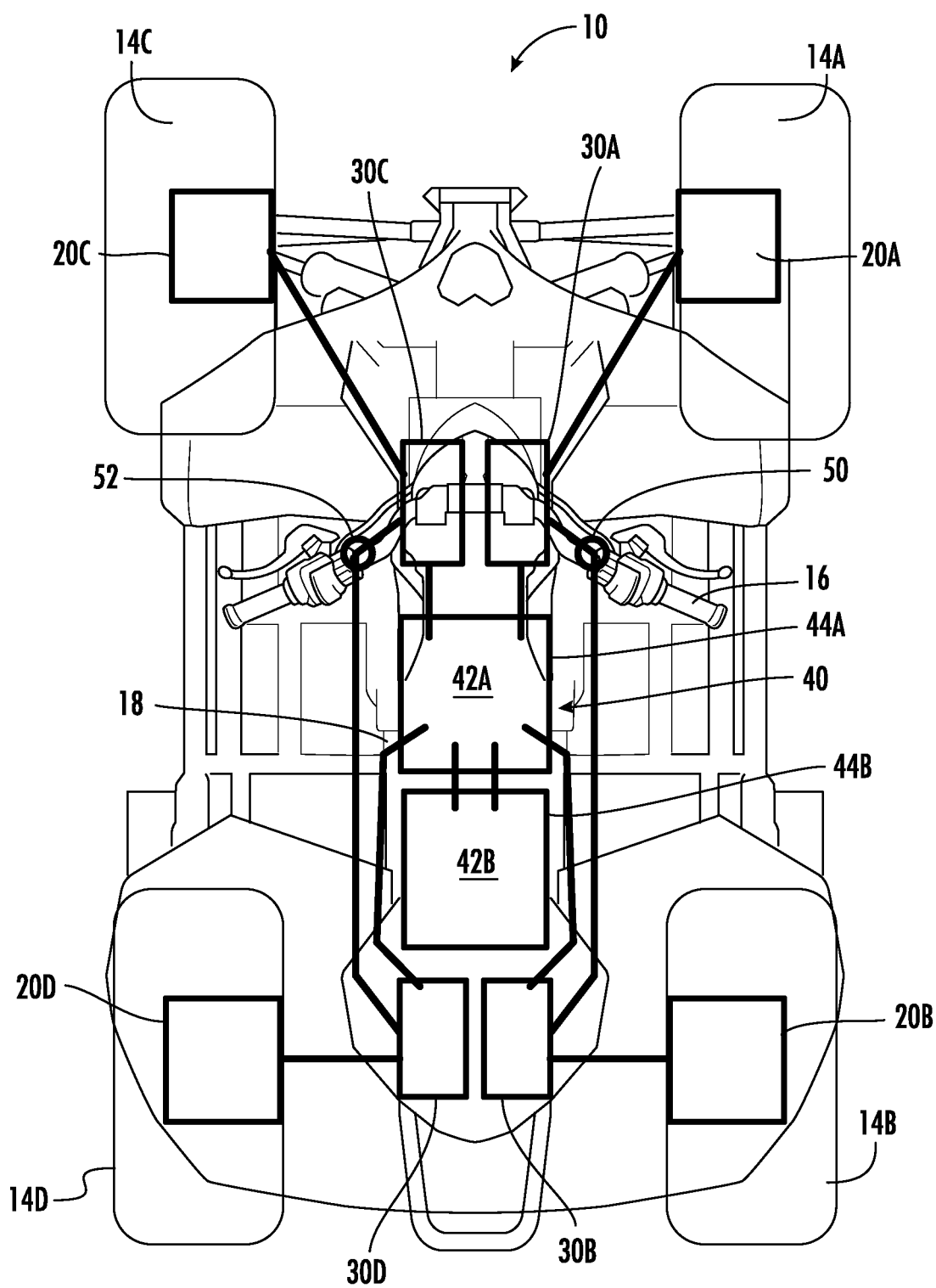

In another aspect, as shown in FIG. 1B, the E-ATV 10 preferably includes a battery system 40 that is comprised of two similar size batteries 42A, 42B that provide power to all four hub motors 20A-20D and their associated motor controllers 30A-30D. The batteries 42A, 42B are located in battery compartments or receiving areas 44A, 44B mounted to the frame 12. This allows for maximum power (i.e., from both batteries 42A, 42B at one time) to any one motor 20A-20D at a time when the ATV 10 needs more or less power to a given motor/controller unit 20A, 30A; 20B, 30B; 20C, 30C; 20D, 30D. This can be distributed via the controls as described in detail below. These batteries 42A, 42B also allow for individual "hot swap" scenarios in the case of one battery unit 42A, 42B failure.

E-ATV Hybrid Power Cell—Hot Swap in Place of One of The Two Batteries

Figure 1C:
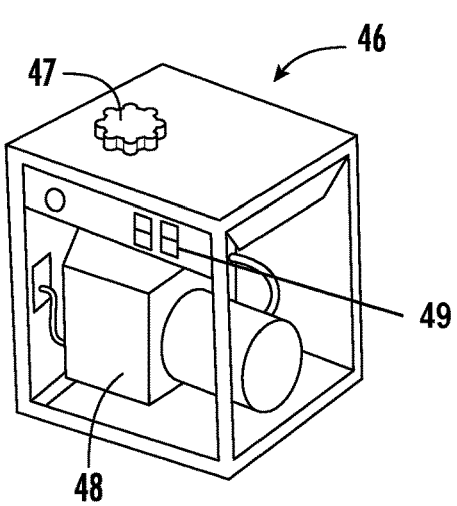
FIG. 1C shows a hybrid power cell that approximately matches the size of one of the batteries.

In further embodiment, in addition to the Hot Swap battery system noted above, a hybrid power cell 46, shown in FIG. 1C is provided that approximately matches the size of one of the batteries 42A, 42B and/or can be located in one of the battery compartments 44A, 44B. This hybrid power cell 46 preferably includes a fuel supply 47 and a fuel driven generator (genset) 48 and can be installed rather than the $2^{nd}$ battery 42B to provide continuous power (on board charging) to the E-ATV 10 with a gasoline or another fuel that drives, for example, an internal combustion engine, that is connected to a generator. The hybrid power cell 46 in this manner can continuously charge the battery 42A which simultaneously runs one or more hub motor 20A-D or alternatively, can be used to recharge the battery 42A when the vehicle is not in motion. In an alternative configuration, the hybrid power cell 46 can be installed adjacent to a single battery 42A in an E-ATV 10 powered solely by said single battery 42A. This genset also functions as an onboard generator that can also provide outlets 49 to power for applications such as tools, equipment, additional external charging or lighting.

The genset configuration can be provided as a separate item that a consumer can purchase separately. For example, the E-ATV 10 can be supplied with only one battery 42A and a second battery 42B or the Genset power system 46 can be separately purchased as the $2^{nd}$ means of power for the E-ATV 10. This genset 46 effectively becomes the "range extender" for the E-ATV 10.

E-ATV Independent Right and Left Handlebar Switch For Independent Control Of Right and Left Motor Systems for Forward, Reverse And Zero Point Turns In a further embodiment as shown in FIGS. 3-7, the E-ATV 10 includes independent right and left handlebar switches 50, 52, which may be 3-way rocker switches, to provide a novel and simple method of controlling the forward and reverse direction of both associated motors 20A, 20B; 20C, 20D on each respective side of the E-ATV 10. The left switch 52 preferably includes forward, reverse, and neutral positions and controls only the two left hub motor/controller units 20C, 30C; 20D, 30D. The right switch 52 preferably includes forward, reverse, and neutral positions and controls only the right hub motor/controller units 20A, 30A; 20B, 30B. This arrangement allows for 4 simple functions without the use of a computer or torque vectoring system to allow for forward, reverse and turning movements.

The functions using the right and left handlebar switches 50, 52 include: a) with both switches 50, 52 (shown in FIG. 3) switched to the forward direction, the two left hub motor/controller units 20C, 30C; 20D, 30D and the two right hub motor/controller units 20A, 30A; 20B, 30B drive in the FORWARD direction to move the E-ATV 10 forward; b) with both switches 50, 52 (shown in FIG. 4) switched to the backward direction, the two left hub motor/controller units 20C, 30C; 20D, 30D and the two right hub motor/controller units 20A, 30A; 20B, 30B drive in the BACKWARD direction to drive the E-ATV 10 backward; c) with the left switch 52 switched to the forward direction, and the right switch 50 switched in the backward direction (shown in FIG. 5) the two left hub motor/controller units 20C, 30C; 20D, 30D drive in the FORWARD direction and the two right hub motor/controller units 20A, 30A; 20B, 30B drive in the BACKWARD direction to spin the E-ATV 10 on its axis to the RIGHT in a "zero point" turn; and d) with the left switch switched to the backward direction, and the right switch switched in the forward direction (shown in FIG. 6) the two left hub motor/controller units 20C, 30C; 20D, 30D drive in the BACKWARD direction and the two right hub motor/controller units 20A, 30A; 20B, 30B drive in the FORWARD direction to spin the E-ATV 10 on its axis to the LEFT in a "zero point" turn.

E-ATV Independent Motor Control

Figure 7:
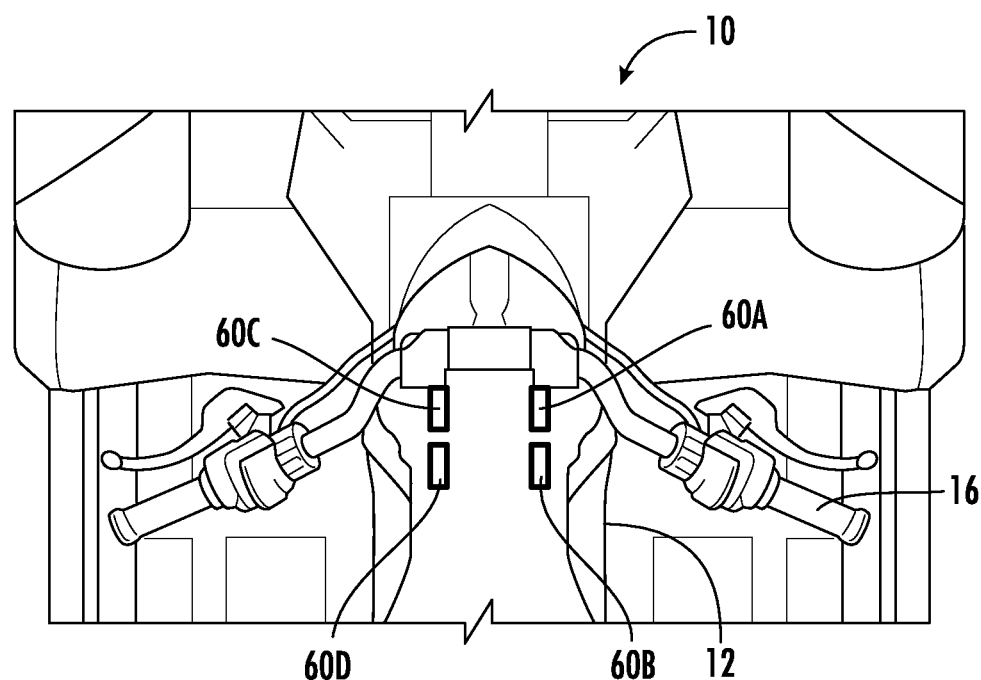
FIG. 7 shows a top view of 3-way rocker switches used for independent motor controls.

In addition to operating the right and left side wheels independently, it is feasible to operate each wheel independently to transfer differing levels of torque to each wheel. As shown in FIG. 7, four switches 60A-60D can be provided that are connected to the respective motor/controller 20A, 30A; 20B, 30B; 20C, 30C; 20D, 30D and independently operate each respective hub motor 20A-20D to power one or more wheels in situations where multiple wheels are slipping for example. The use of separate motor controllers 30A-D in this configuration of the E-ATV 10 further eliminates the need for a central computer-module controller that controls all 4 motors 20A-D which significantly reduces costs and software complexity of the E-ATV 10. In the current configuration of the E ATV 10, the need for a central controller to monitor wheel slippage or traction is not needed at normal operating speeds because the hub motors and wheels 20A-D, 14A-D will "freewheel" (not driving) when traction is more readily available to any of the other wheels. These switches 60A-60D can be simple 3-way rockers (or similar) that have forward, reverse or off for each hub motor 20A-20D and/or the associated controller 30A-30D.

Figure 8:
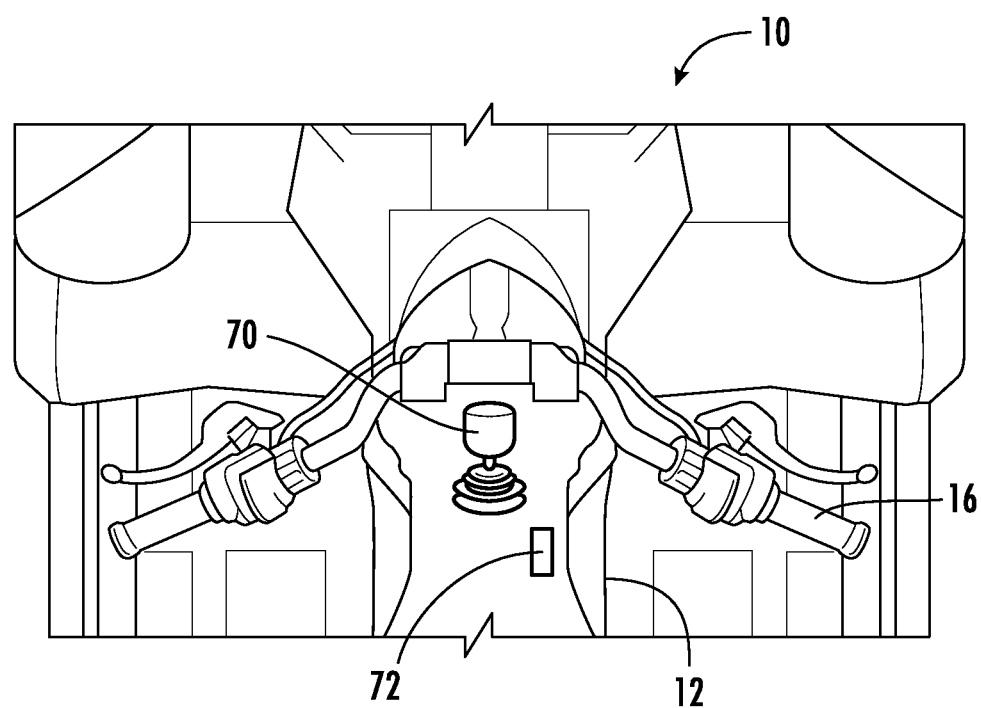
FIG. 8 shows a top view of joystick used for independent motor controls.

Alternatively, as shown in FIG. 8, a toggle or Joystick switch 70 can be used to directionally power each wheel with additional torque. For example, pushing the Joystick switch 70 to the upper left would put more power to the front left hub motor/controller 20C, 30C. Pushing the Joystick switch 70 to the lower right would put more power to rear right hub motor/controller 20B, 30B, and so on.

A separate master switch 72 can be provided that is connected to the controllers 30A-30D to control forward or reverse and to engage the toggle capability which could be limited primarily for slow speed operation.

Additionally, the same type of Joystick control can be connected to each hub motor/controller 20A, 30A; 20B, 30B; 20C, 30C; 20D, 30D instead of the independent switches and can operate the hub motors 20A-20D in the same configuration as above with the additional feature of a twisting joystick to turn the ATV on its axis left or right for a zero point turn.

E-ATV with Drive Gear Reduction for Each Wheel

Figure 9:
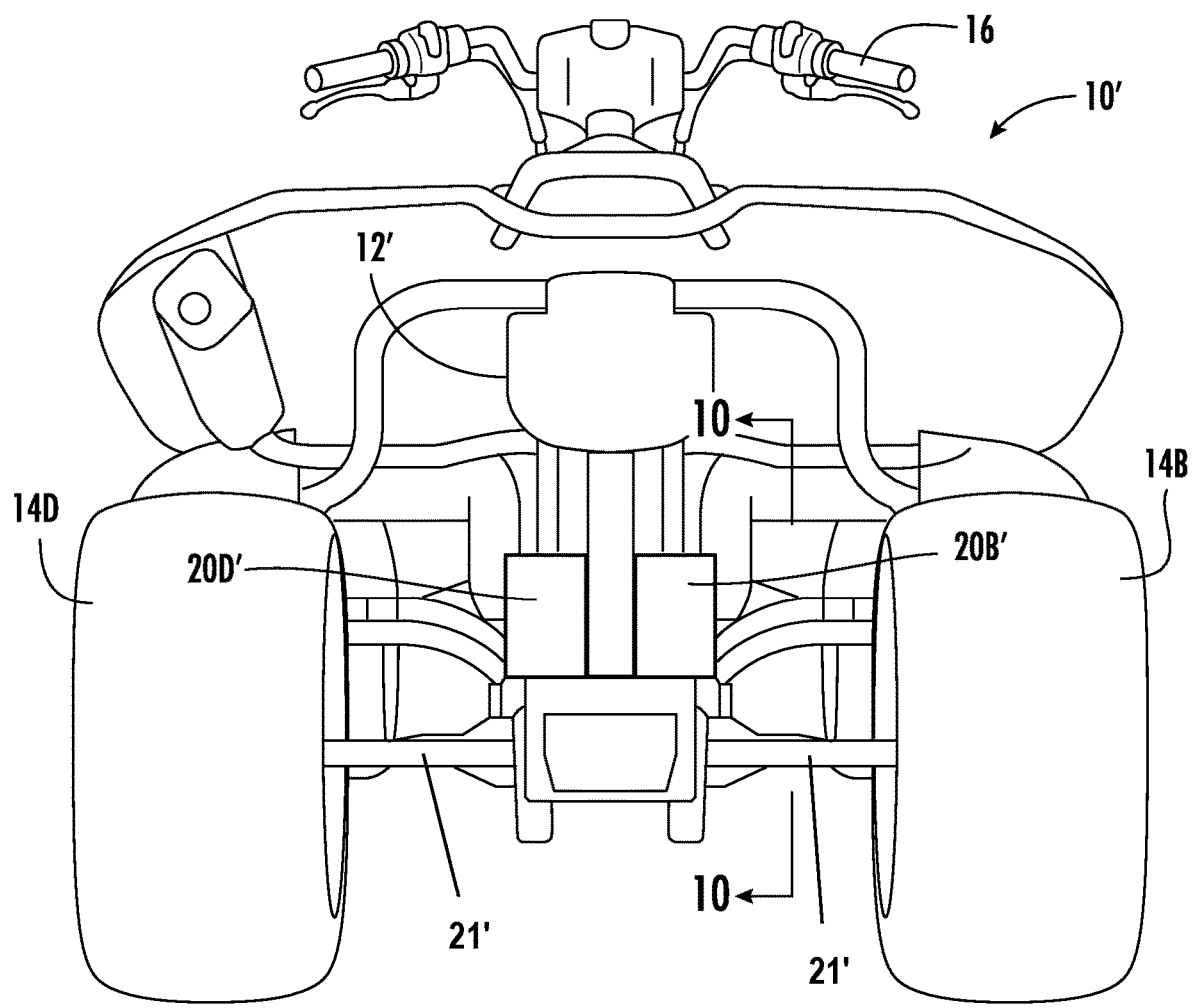
FIG. 9 is a rear view of a second embodiment of an E-ATV.
Figure 10:
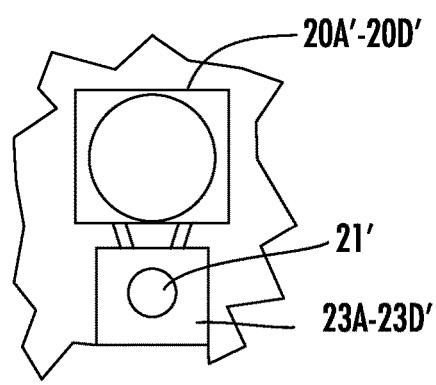
FIG. 10 is a view taken along line 10-10 in FIG. 9 showing a frame mounted motor and transmission used to drive a wheel, with each wheel having its own independent motor and transmission.
Figure 11:
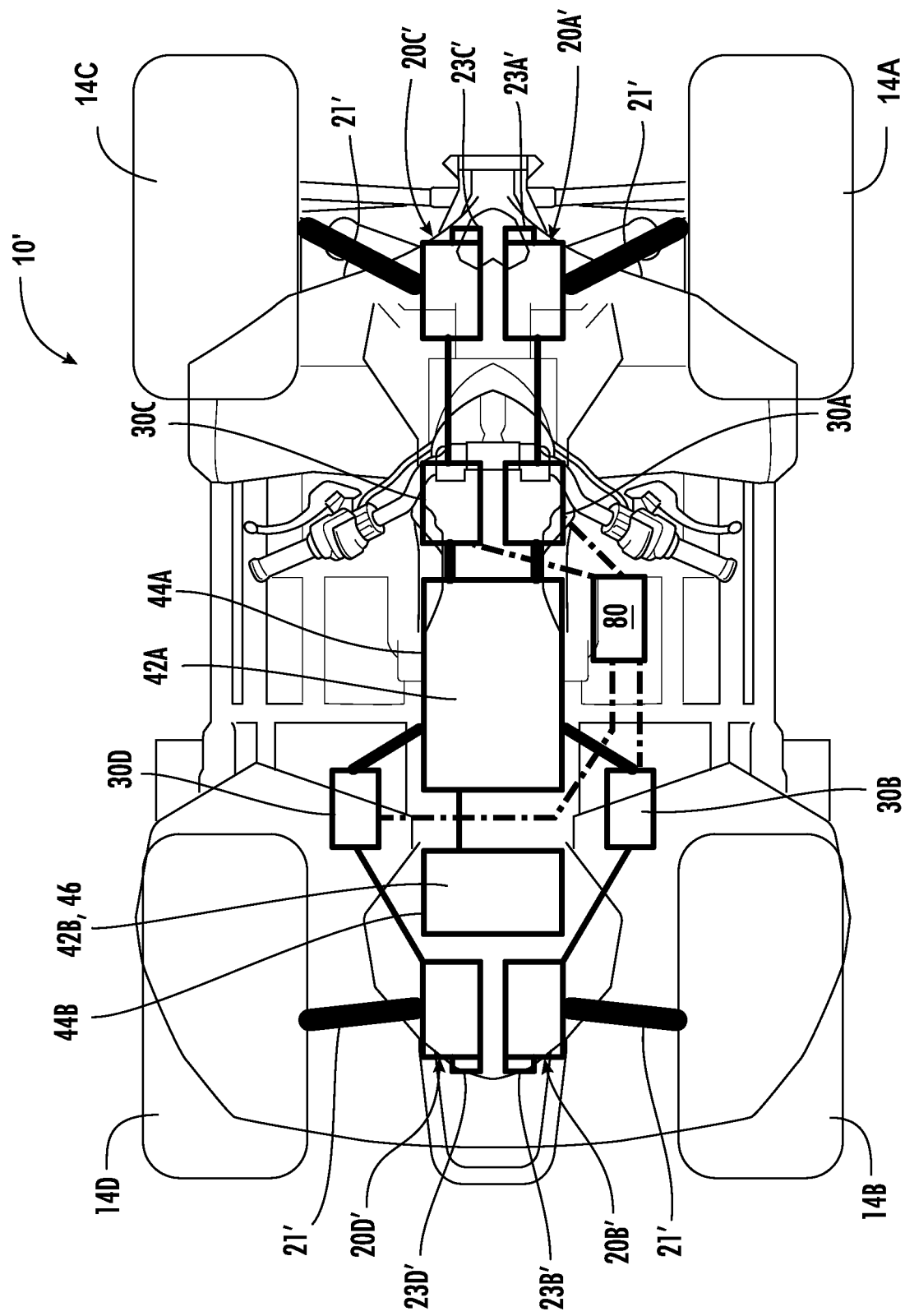
FIG. 11 is a schematic top view of the E-ATV of FIG. 9 showing all of the major component assemblies.

Referring to FIGS. 9-11, another embodiment of the E-ATV 10' is shown. The E-ATV 10' includes a frame 12' a frame with at least one battery 42A, 42B mounted on the frame 12'. As discussed above, the at least one battery 42A, 42B defines a battery envelope and the frame 12' including at least two battery compartments or receiving areas 44A, 44B mounted to the frame 12, with each being configured to accommodate the battery envelope. Here, 4 motors 20A'-20D' are connected to the frame 12', and a wheel 14A-14D is drivingly connected to each of the motors in this case via a drive shaft 21', preferably a CV shaft. Each of the motors 20A'-20D' includes an independent controller 30A-30D, as discussed above. The motors 20A'-20D' and associated ones of the controllers 30A-30D are each configured to independently provide both forward and reverse power and torque to the respective wheels 14A-14D to propel the ATV.

Preferably, a separate gear box 23A'-23D' is provided in the power train between each motor 20A'-20D' and the associated drive shaft 21' in order to provide a gear reduction for increased power delivery to the associated wheel 14A-14D. The gear reduction can be a fixed ratio, for example 6:1 to 10:1, to provide increased torque to the wheels 14A-14D. Alternatively, each gearbox can provide multiple different selectable gear ratios and may be switched or shifted between the different gear ratios via a user input.

The wheels 14A-14D in this embodiment of the E-ATV 10' are mounted by upper and lower suspension arms that are pivotally connected to respective wheel hubs and the frame 12' in a known manner.

The E-ATV 10' can include one or more of the genset 46 as discussed above, the independent right and left handlebar switches 50, 52 as discussed above, the four switches 60A-60D for independent motor control as discussed above, and/or the joystick switch 70.

In an alternative embodiment, a central control computer module 80 (indicated in FIG. 11) having a processor and associated memory with programming may be used to sense the spin rate of the wheels 14A-14D, for example via a sensor located at each wheel 14A-14D or via current drawn by the associated motor 20A-20D, and when one wheel 14A-14D slips and thereby spins significantly faster than the other wheels 14A-14D, the central control module 80 will reduce the speed of the faster rotating wheels to transfer power to the non-slipping wheels. This can also be incorporated in the first embodiment of the E-ATV 10.

Many of the features in the embodiments noted above can be used separately or one or more of these features can be combined together in one E-ATV 10, 10'.

It is noted that some of the electrical connections between the batteries, the controllers 30-30D, the motors 20A-20D; 20A'-20D', and control switched 50, 52; 60A-60D, 70 are schematically shown in FIGS. 1B and 11, and are merely exemplary. Such electrical connections between these elements in order to provide the desired current to the motors and input signals to the controllers 30A-30D would be readily understood by the ordinarily skilled artisan based on the present disclosure.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

The invention claimed is:

1. An electric ATV, comprising:
   a frame;
   at least one battery mounted on the frame;
   4 motors connected to the frame, a wheel drivingly connected to each of the motors, each of the motors including an independent controller, the motors and associated ones of the controllers each being configured to independently provide both forward and reverse power and torque to the respective wheels to propel the ATV; and
   independent right and left motor switches configured to control a forward and reverse direction of both associated motors on a respective right or left side of the electric ATV, the left motor switch controls only the two left motors and the associated controllers, and the right switch controls only the two right motors and the associated controllers, wherein the right and left motor switches provide movement functions without the use of a computer or torque vectoring system, as follows:
   a) with both the right and left switches switched to a forward direction, the two left motors and the associated controllers and the two right motors and the associated controllers drive in a forward direction;
   b) with both the right and left switches switched to a backward direction, the two left motors and the associated controllers and the two right motors and the associated controllers drive in a backward direction;
   c) with the left switch switched to the forward direction, and the right switch switched in the backward direction the two left motors and the associated controllers drive in the forward direction and the two right motors and the associated controllers drive in the backward direction to spin the electric ATV to the right in a zero point turn; and
   d) with the left switch switched to the backward direction, and the right switch switched in the forward direction the two left motors and the associated controllers drive in the backward direction and the two right motors and the associated controllers drive in the forward direction to spin the electric ATV to the left in a zero point turn.

2. The electric ATV of claim 1, wherein the 4 motors are hub motors and the wheels are directly connected to the hub motors.

3. The electric ATV of claim 1, wherein the 4 motors are mounted to the frame and are connected to the wheels via drive shafts.

4. The electric ATV of claim 3, further comprising a gear reduction transmission between each respective motor and the associated drive shaft.

5. The electric ATV of claim 1, wherein the at least one battery defines a battery envelope and the frame includes at least two receiving areas, each configured to accommodate the battery envelope; and
   a hybrid power cell including a fuel driven generator that is adapted to provide power for recharging the at least one battery.

6. The electric ATV of claim 5, wherein the hybrid power cell is located in one of the at least two receiving areas.

7. The electric ATV of claim 5, wherein the hybrid power cell is configured to provide auxiliary power for other devices.

8. The electric ATV of claim 2, wherein each of the hub motors is mechanically attached to the frame using a quick-release connector and an electrical plug connection.

9. The electric ATV of claim 8, wherein the quick-release connector is a pin.

* * * * *